(12) United States Patent
Kimoto

(10) Patent No.: US 8,036,786 B2
(45) Date of Patent: Oct. 11, 2011

(54) ON-VEHICLE CONTROL APPARATUS

(75) Inventor: Yasuhiro Kimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1451 days.

(21) Appl. No.: 11/506,892

(22) Filed: Aug. 21, 2006

(65) Prior Publication Data

US 2007/0250254 A1     Oct. 25, 2007

(30) Foreign Application Priority Data

Mar. 24, 2006  (JP) .................... 2006-083043

(51) Int. Cl.
*G01M 17/00*  (2006.01)
*G06F 7/00*   (2006.01)
*G06F 19/00*  (2011.01)

(52) U.S. Cl. .......... 701/29; 701/114; 701/1; 701/31; 701/35; 701/115

(58) Field of Classification Search ............ 382/154
See application file for complete search history.

(56) References Cited

U.S. PATENT DOCUMENTS

| | | | | |
|---|---|---|---|---|
| 5,278,759 A | * | 1/1994 | Berra et al. ............. | 701/1 |
| 6,108,598 A | * | 8/2000 | Sumitani ............... | 701/29 |
| 6,243,627 B1 | * | 6/2001 | Ozeki ................... | 701/29 |
| 6,643,572 B2 | * | 11/2003 | Kohge et al. ............ | 701/41 |
| 7,890,227 B2 | * | 2/2011 | Sayama et al. .......... | 701/29 |

FOREIGN PATENT DOCUMENTS

JP            9-288573 A    11/1997

* cited by examiner

*Primary Examiner* — Khoi Tran
*Assistant Examiner* — Bao Long T Nguyen
(74) *Attorney, Agent, or Firm* — Sughrue Mion, PLLC

(57) ABSTRACT

Provided is an on-vehicle control apparatus capable of automatically initializing control variables in a backup RAM only in rewriting a control program in the market. The on-vehicle control apparatus includes a CPU for controlling an on-vehicle device according to a control program, a non-volatile ROM for storing the control program therein, a backup RAM for storing control variables therein, a backup power supply circuit for supplying power to the backup RAM, a boot program for rewriting the control program, an address changeover circuit for making a changeover in execution address, and a memory rewrite unit. The memory rewrite unit outputs a rewrite signal, a command signal group including a command for activating the boot program, and an erasure command signal for erasing a diagnostic code. The control program initializes the control variables in the backup RAM in response to the erasure command signal when being activated after having been rewritten.

7 Claims, 10 Drawing Sheets

DURING NORMAL OPERATION
(WHEN REWRITE SIGNAL A IS OFF)

IN REWRITING CONTROL PROGRAM
(WHEN REWRITE SIGNAL A IS ON)

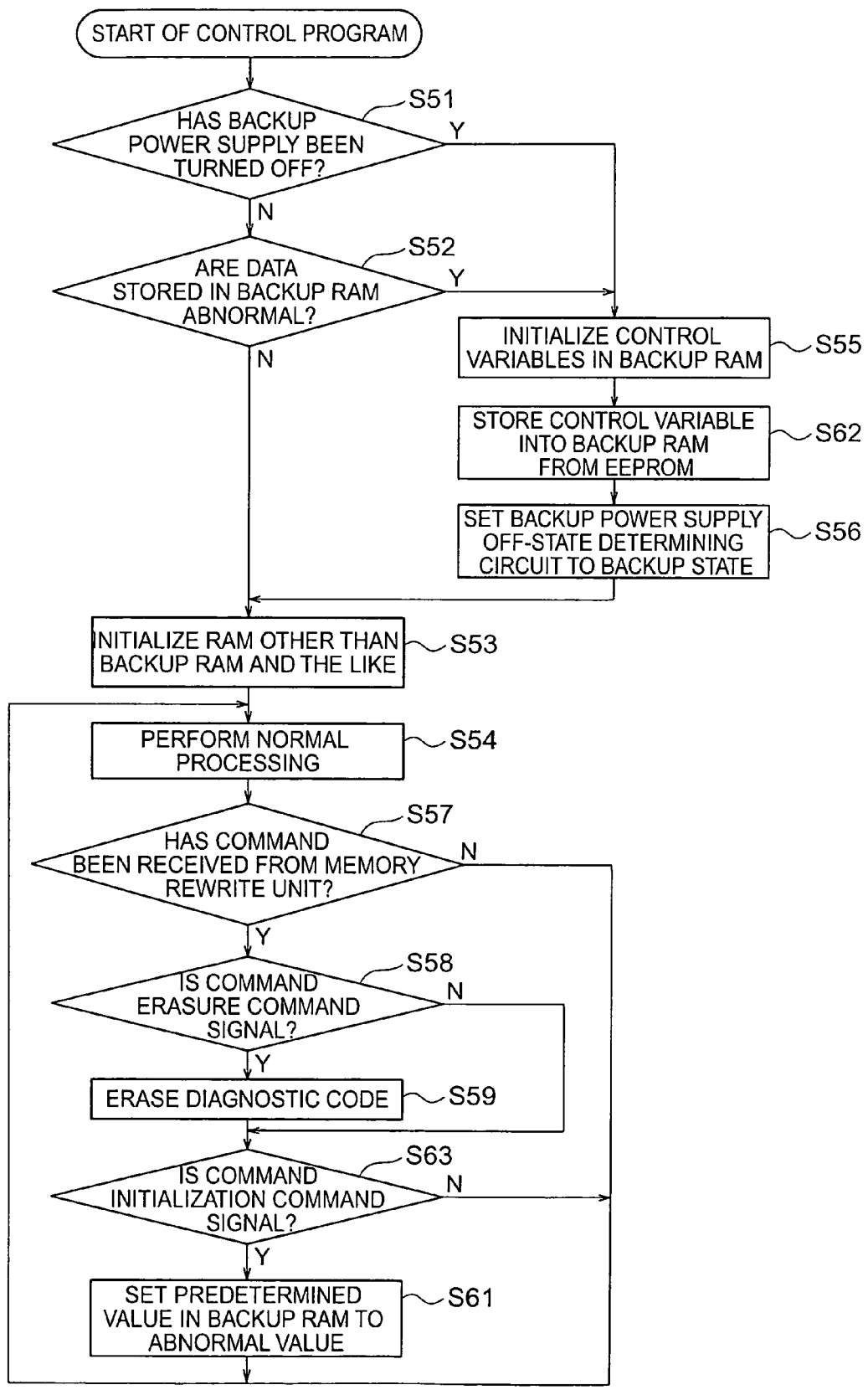

ON-VEHICLE CONTROL APPARATUS

BACKGROUND OF THE INVENTION

1. Field of the Invention

The present invention relates to an on-vehicle control apparatus constructed of an electronic control unit (ECU) for controlling, for example, an engine and an on-vehicle power train including a transmission.

2. Description of the Related Art

In general, an on-vehicle control apparatus includes a CPU, a non-volatile memory, a backup RAM, a backup power supply circuit, a boot program, an address changeover circuit, a memory rewrite unit, and a backup power supply off-state determining circuit.

The CPU controls an on-vehicle device based on a control program using various control variables. The non-volatile memory, which is rewritable, stores a control program therein. The backup RAM stores the control variables therein. The backup power supply circuit is connected to a battery to supply power to the backup RAM. The boot program causes the CPU to rewrite the control program.

The address changeover circuit loads the boot program into an execution address of the CPU in rewriting the control program. The memory rewrite unit outputs a rewrite signal for causing the address changeover circuit to operate and a command signal for activating the boot program. The backup power supply off-state determining circuit usually holds a state of determining that the backup power supply circuit is on, and is fixed to a state of determining that the backup power supply circuit is off when it is turned off even once.

To check consistency of the control variables stored in the backup RAM, the control program compares a criterial value in the non-volatile memory with a predetermined value in the backup RAM when being activated.

When it is determined that the predetermined value in the backup RAM does not coincide with the criterial value in the non-volatile memory, the control program determines that the battery has been shut off, and initializes the control variables in the backup RAM.

In a case where the boot program has been used to rewrite the control program in the non-volatile memory, the control program compares the criterial value in the non-volatile memory with the predetermined value in the backup RAM in the same manner as described above when being activated after having been rewritten.

However, in a case where the resolution and the like of the control variables in the backup RAM are changed between the control program to be rewritten and the control program that has been rewritten, the CPU executes the changed control program using the control variables (last values) in the backup RAM. This may lead to, for example, an erroneous control of the engine.

Accordingly, when the control program in the non-volatile memory has been changed, the control variables in the backup RAM need to be initialized to values corresponding to a new control program in order to avoid an inconvenience resulting from an incompatibility between the changed control program and the control variables (last values) in the backup RAM.

Therefore, there has been proposed a method in which the battery is temporarily disconnected from the on-vehicle control apparatus to shut off the supply of power to the backup power supply circuit in rewriting the control program in the non-volatile memory, and the control variables in the backup RAM are initialized based on information from the backup power supply off-state determining circuit when the control program is activated after having been rewritten.

However, if the battery is disconnected every time the control program is rewritten, information stored in various kinds of other devices sharing the backup power supply circuit is also cleared.

Thus, backup RAMs in those devices need to be initialized again, which causes an increase in the number of rewrite processes and may lead to a rise in cost.

Also, a failure of initializing the backup RAM may arise if the backup power supply circuit has not been shut off, or a rise in cost may result from an increase in the number of processes of disconnection and connection.

Therefore, in such a conventional on-vehicle control apparatus as disclosed in, for example, JP 9-288573 A, an initialization flag set by the boot program is provided on the backup RAM in rewriting the control program in the non-volatile memory, and the control program initializes the control variables in the backup RAM in response to a set state of the initialization flag when being activated after having been rewritten.

In the conventional on-vehicle control apparatus, the control variables in the backup RAM are initialized in response to the set state of the initialization flag set by the boot program. However, the boot program usually remains unchanged throughout a development stage and a mass production stage. Therefore, the control variables in the backup RAM are also initialized in rewriting the control program in the development stage.

Thus, a learning process for an idle state and other such process need to be carried out every time the control program is rewritten, which causes a problem in that an efficiency of development is prevented from being enhanced.

SUMMARY OF THE INVENTION

The present invention has been made to solve the problem as described above, and it is therefore an object of the invention to provide an on-vehicle control apparatus capable of automatically initializing control variables in a backup RAM in rewriting a control program in the market instead of initializing the control variables in the backup RAM in rewriting the control program in a development stage.

According to the present invention, there is provided an on-vehicle control apparatus including:

a CPU for controlling an on-vehicle device based on a control program using various control variables;

a rewritable non-volatile memory for storing the control program;

a backup RAM for storing the control variables therein;

a backup power supply circuit for supplying power to the backup RAM;

a boot program for causing the CPU to rewrite the control program;

an address changeover circuit for making a changeover in an execution address of the CPU to the boot program in rewriting the control program; and a memory rewrite unit, in which:

the memory rewrite unit outputs a rewrite signal for causing the address changeover circuit to operate, a command signal group including a command for activating the boot program, and an erasure command signal for erasing a diagnostic code after the control program has been rewritten; and the control program initializes the control variables in the backup RAM in response to the erasure command signal when being activated after having been rewritten.

In the on-vehicle control apparatus according to the present invention, the memory rewrite unit outputs the erasure command signal for erasing the diagnostic code, and the control program initializes the control variables in the backup RAM in response to the erasure command signal when being activated after having been rewritten.

Therefore, the control variables in the backup RAM are not initialized in rewriting the control program in the development stage, but can be automatically initialized in rewriting the control program in the market. As a result, the efficiency of development can be enhanced.

BRIEF DESCRIPTION OF THE DRAWINGS

In the accompanying drawings:

FIG. 11 is a flowchart showing the operation of an on-vehicle control apparatus according to a fourth embodiment of the present invention.

DETAILED DESCRIPTION OF THE PREFERRED EMBODIMENTS

Respective embodiments of the present invention will be described hereinafter based on the drawings, in which like or corresponding members and portions are denoted by like reference symbols.

First Embodiment

Figure 1:
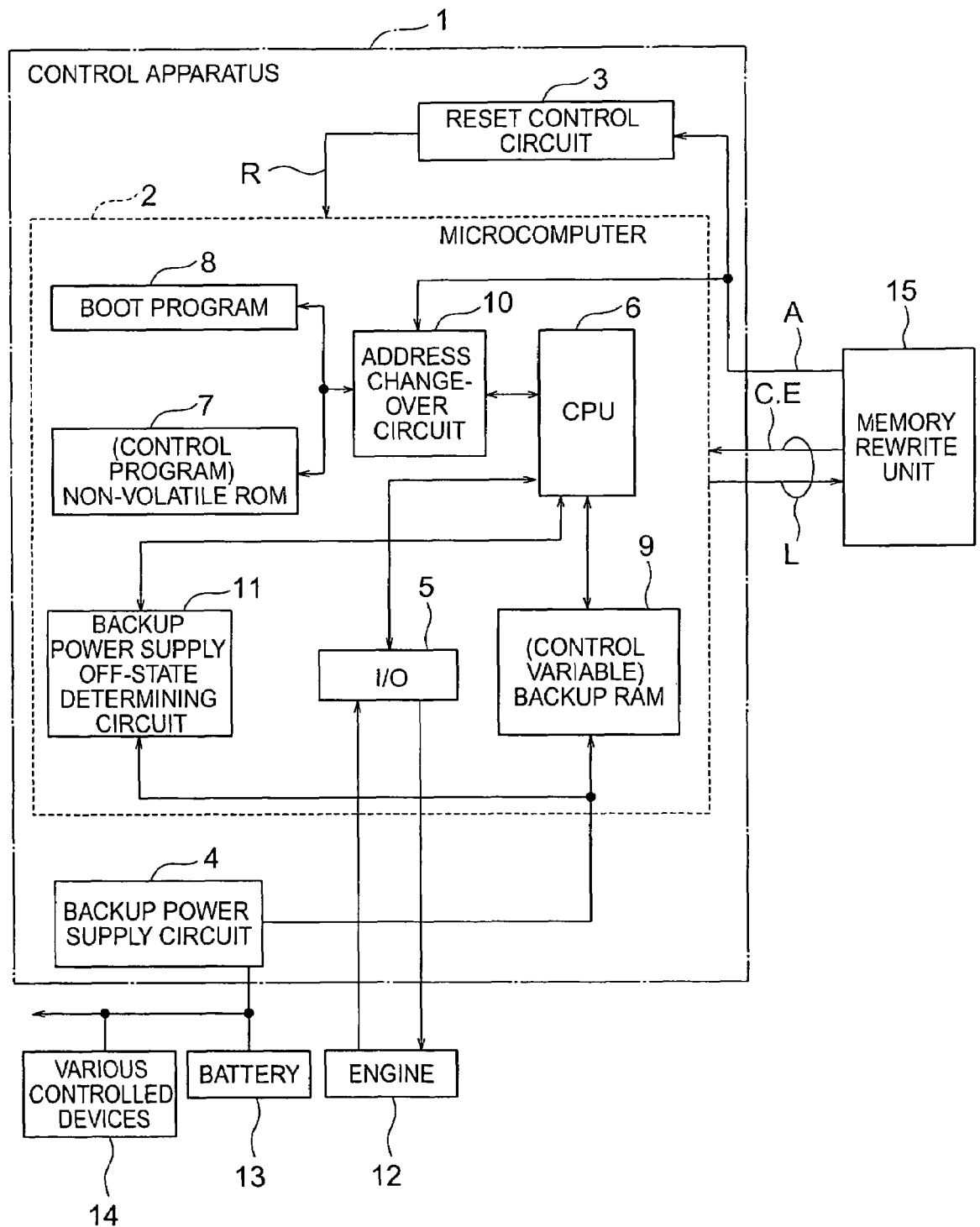
FIG. 1 is a block diagram showing a generally employed on-vehicle control apparatus.

FIG. 1 is a block diagram showing a generally employed on-vehicle control apparatus such as an engine control apparatus or the like.

Referring to FIG. 1, a control apparatus 1 constructed as an electronic control unit (an ECU) is equipped with a microcomputer 2, a reset control circuit 3 for resetting (initializing) an operating condition in the microcomputer 2, a backup power supply circuit 4 for backing up the supply of power to the microcomputer 2, and an external input/output interface (not shown) for connecting an input/output interface (I/O) 5 in the microcomputer 2 to an external controlled object (to be described later).

The microcomputer 2 is equipped with a CPU 6 for controlling an on-vehicle device such as an engine, a power train, or the like according to a control program (to be described later) using various control variables (to be described later), a rewritable non-volatile ROM (a non-volatile memory) 7 for storing therein the control program for operating the CPU 6, a boot program 8 for operating the CPU 6 to rewrite the control program in the non-volatile ROM 7, and a backup RAM 9 for storing therein the control variables related to the control program.

The non-volatile ROM 7 is constructed of a programmable ROM which is erasable, such as a flash ROM or the like.

The boot program 8 is stored in a ROM that is different from the non-volatile ROM 7.

A criterial value for determining whether or not data stored in the backup RAM 9 are normal and a predetermined value are stored in each of the non-volatile ROM 7 and the backup RAM 9.

The microcomputer 2 is also equipped with an address changeover circuit 10, which is interposed between the CPU 6 on the one hand, and the non-volatile memory 7 and the boot program 8 on the other. In rewriting the control program, the address changeover circuit 10 makes a changeover in an execution address in a memory map (to be described later) of the CPU 6 from the control program in the non-volatile ROM 7 to the boot program 8.

Furthermore, the microcomputer 2 is equipped with an input/output interface 5 and a backup power supply off-state determining circuit 11. The CPU 6 in the microcomputer 2 is connected to an external controlled object (to be described later) via the input/output interface 5 and the external input/output interface.

The backup power supply off-state determining circuit 11 usually holds a state of determining that the backup power supply circuit 4 is on, and is fixed to a state of determining that the backup power supply circuit 4 is off when it is turned off even once.

The non-volatile ROM 7 and the boot program 8 in the microcomputer 2 are connected to the CPU 6 via the address changeover circuit 10. The backup RAM 9, the input/output interface 5, and the backup power supply off-state determining circuit 11 are directly connected to the CPU 6.

The backup RAM 9 and the backup power supply off-state determining circuit 11 are connected to the backup power supply circuit 4.

The input/output interface 5 in the microcomputer 2 is connected to an engine 12 as the external controlled object via the external input/output interface in the control apparatus 1. The backup power supply circuit 4 is connected to an on-vehicle battery 13 and various kinds of other controlled devices 14 (controlled devices such as an on-vehicle phone, a clock, an FM radio, and the like). The backup RAM 9 is supplied with power from the battery 13 via the backup power supply circuit 4.

A memory rewrite unit 15, which is connected to the control apparatus 1 according to need, is connected to the control apparatus 1 via a bidirectional communication line L in rewriting (updating) the control program in the non-volatile ROM 7. The memory rewrite unit 15 outputs are write signal A for operating the address changeover circuit 10 and updating the control program according to a new specification, a command signal group C including a command to activate the boot program 8, an erasure command signal E for erasing a diagnostic code (to be described later), various data signals (not shown), and the like.

The rewrite signal A, which assumes an on state or an off state, operates the reset control circuit 3 and the address changeover circuit 10 to reset an operating condition (an execution address) of the CPU 6 through a reset signal R output from the reset control circuit 3, and arrange the boot program 8 in a reset execution address of the CPU 6.

The command signal group C including various commands and the data signals are input from the communication line L to the CPU 6 via an input/output interface (not shown), and operate the boot program 8 for rewriting the control program to perform processings of initializing (clearing) the control program in the non-volatile ROM 7, checking data, and rewriting them, and the like.

The diagnostic code is a record of a communication abnormality caused in rewriting a control program in an inter-ECU communication system. The erasure command signal E for erasing the diagnostic code is output to all the ECUs mounted in a vehicle after the control program has been rewritten, and the rewritten control program has been activated through a changeover in the rewrite signal A from the on state to the off state.

Figure 2A:
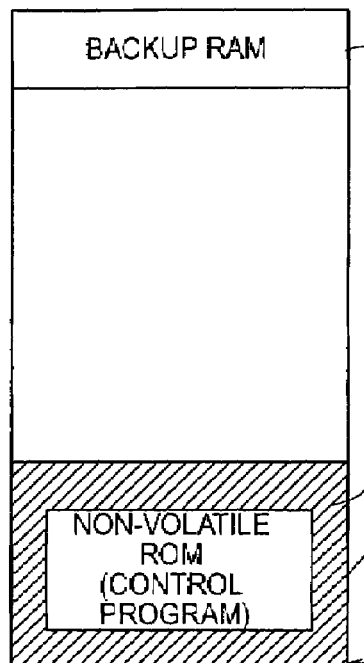
FIG. 2 is an explanatory diagram showing a memory map of a CPU in the generally employed on-vehicle control apparatus.
Figure 2B:
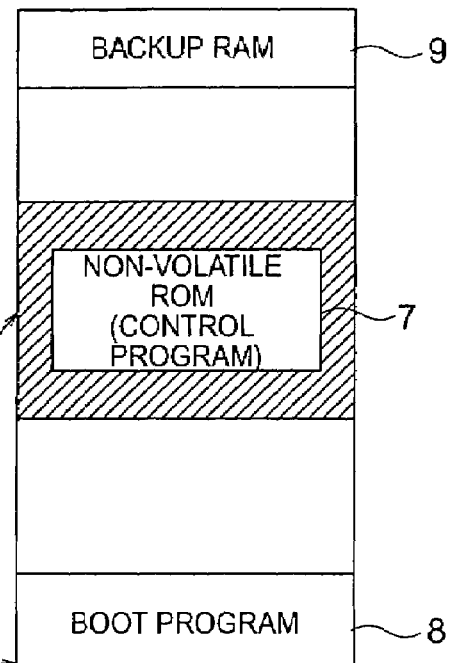

FIG. 2 is an explanatory diagram showing a regional relationship in the memory map of the CPU 6. FIG. 2A shows a state during normal operation (i.e., when the rewrite signal A is off). FIG. 2B shows a state in rewriting the control program (i.e., when the rewrite signal A is on). A changeover between respective memory regions during normal operation (FIG. 2A) and in rewriting the control program (FIG. 2B) is made by the address changeover circuit 10, and the reset execution address is located at a lowermost position of the memory map.

In other words, while the boot program 8 for rewriting the control program is located outside the region of the execution address, namely, outside the memory map of the CPU 6 (see broken lines) during normal operation (FIG. 2A), it is shifted to an execution address position corresponding to the start of the processings by the CPU 6 in rewriting the control program (FIG. 2B).

Figure 3:
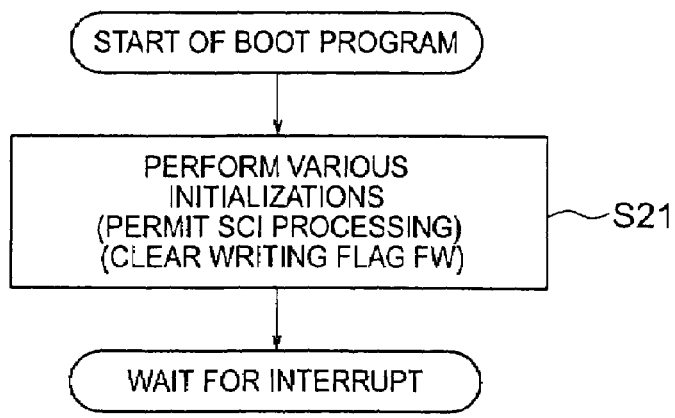
FIG. 3 is a flowchart showing an initialization control routine of a generally employed boot program.
Figure 4:
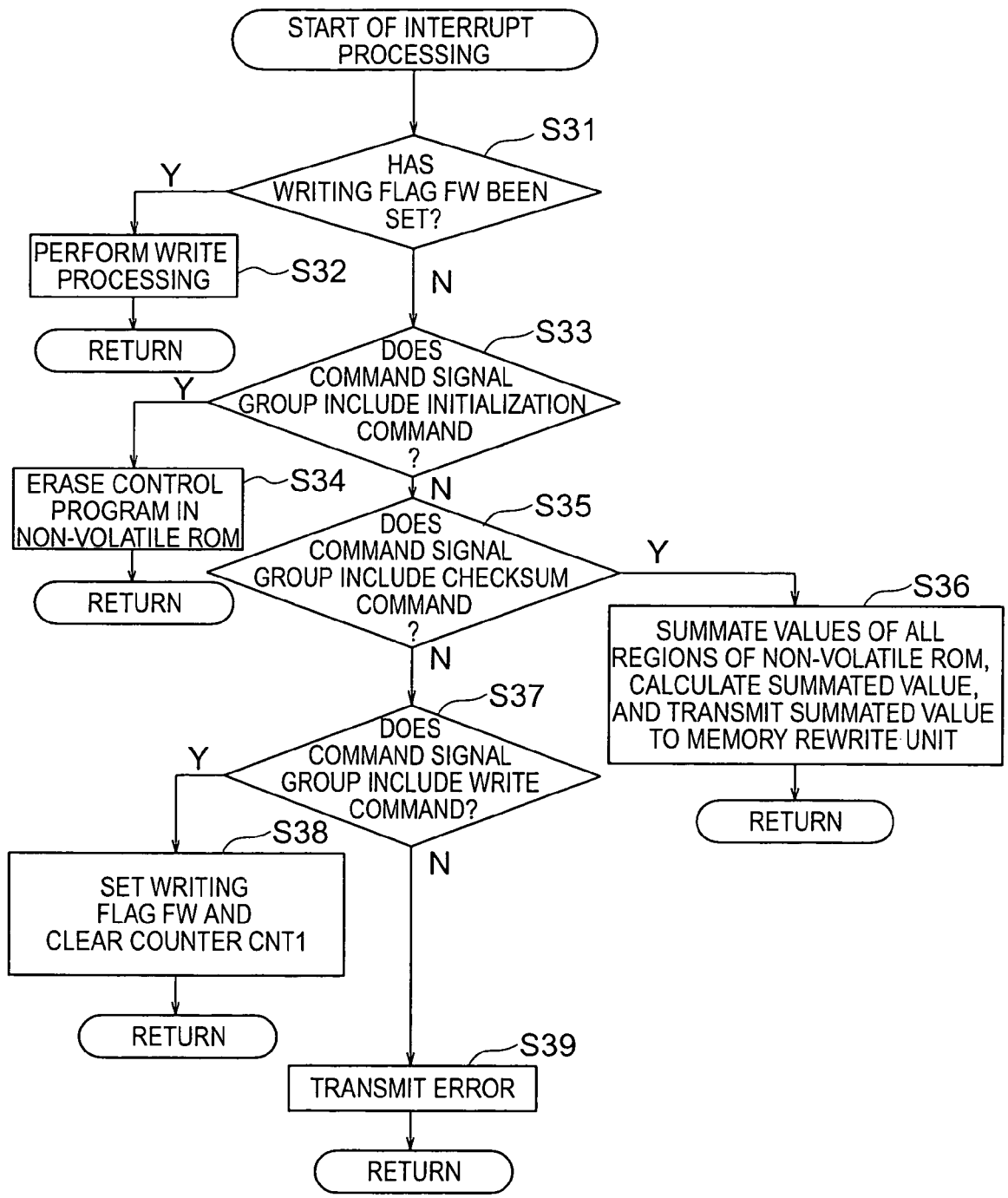
FIG. 4 is a flowchart showing a serial interrupt processing routine of the generally employed boot program.
Figure 5:
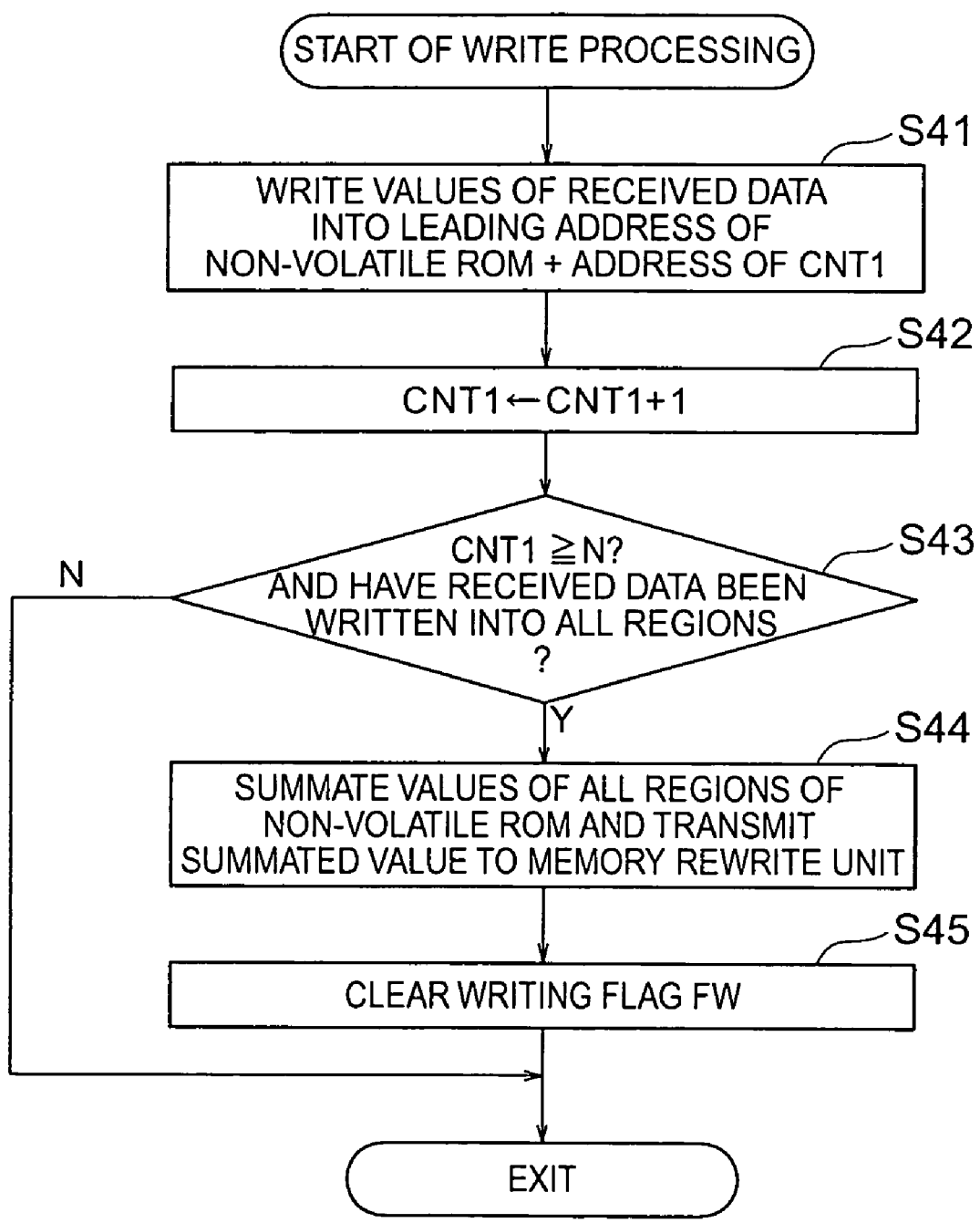
FIG. 5 is a flowchart showing a write processing routine executed in changing a generally employed control program.

FIGS. 3 to 5 are flowcharts each showing a processing routine of the boot program 8. FIG. 3 shows an initialization processing routine executed according to the command signal group C. FIG. 4 shows a serial interrupt (SCI) processing routine executed in response to the command signal group C. FIG. 5 shows a write processing routine according to the command signal group C and the data signals.

Figure 6:
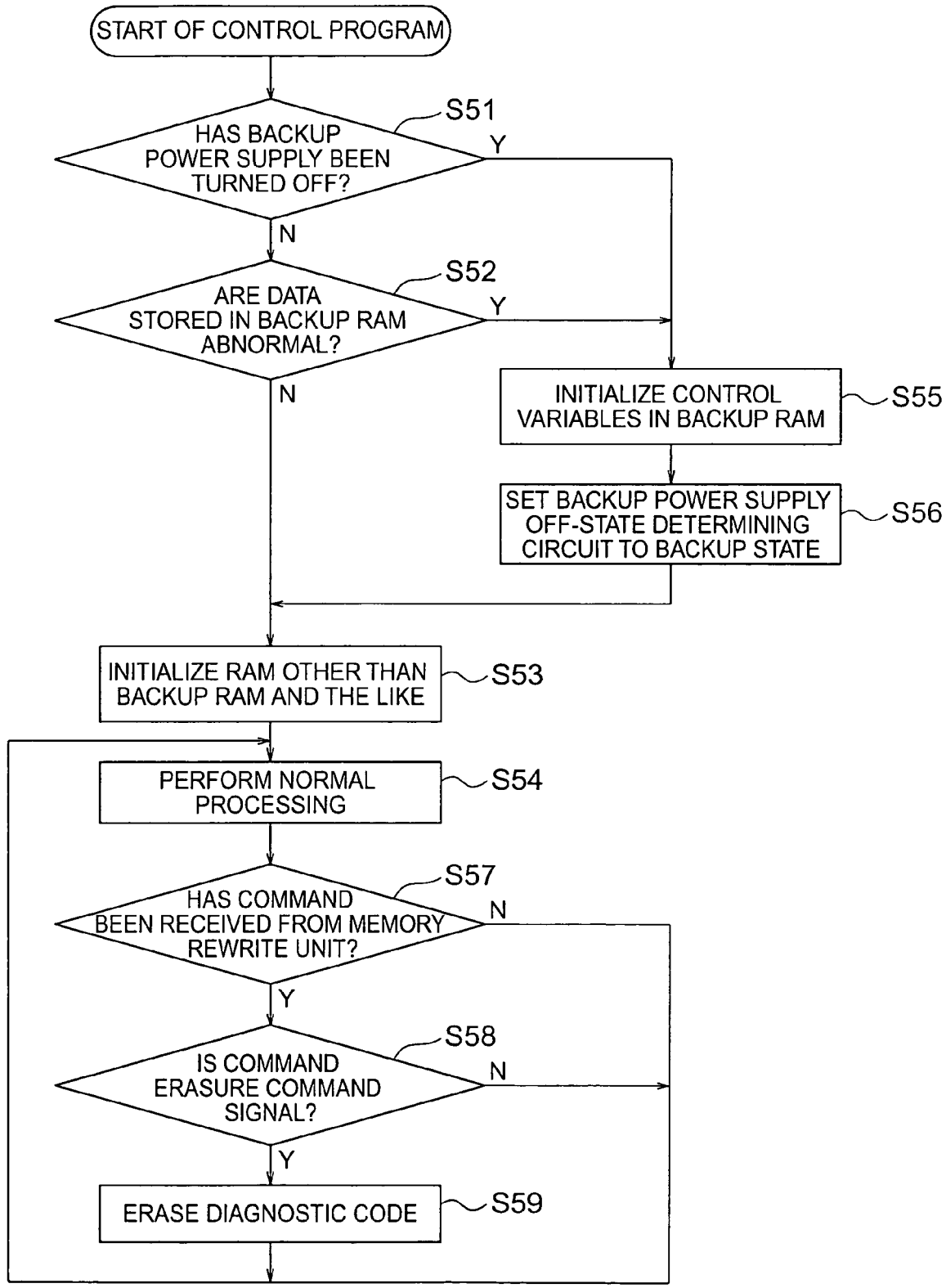
FIG. 6 is a flowchart showing a processing operation of the generally employed control program.

FIG. 6 is a flowchart showing a processing routine of the control program in the non-volatile ROM 7.

Next, the operation of the generally employed on-vehicle control apparatus shown in FIG. 1 will be described with reference to FIGS. 2 to 6.

The CPU 6 in the control apparatus 1 executes the control program (which has been written on the non-volatile ROM 7) located at the execution address during normal operation as shown in FIG. 2A, thereby controlling the engine 12 and the like.

The CPU 6 executes the boot program 8 located at the execution address in rewriting the control program as shown in FIG. 2B.

In an on-vehicle control apparatus for controlling an on-vehicle device such as an engine or the like, as a rule, the control program in the non-volatile ROM 7 is rewritten according to a required specification.

This rewrite operation is performed according to the boot program 8, which is stored in a ROM that is different from the non-volatile ROM 7, so that a program for the rewrite processing is not erased even when the non-volatile ROM 7 is erased.

The address changeover circuit 10 in the microcomputer 2 is designed to make a changeover in the program to be executed by the CPU 6. When the rewrite signal A output from the memory rewrite unit 15 is off (i.e., during normal operation), the address changeover circuit 10 selects the control program in the non-volatile ROM 7 (see FIG. 7A). When the rewrite signal A is on (i.e., in rewriting the control program), the address changeover circuit 10 selects the boot program 8 (see FIG. 7B).

In other words, the program to be executed by the CPU 6 is changed over from the control program in the non-volatile ROM 7 to the boot program 8 in response to a change in the rewrite signal A from the off state to the on state, and from the boot program 8 to the control program in response to a change in the rewrite signal A from the on state to the off state.

Owing to a change in the rewrite signal A between the on state and the off state, the reset signal R is output from the reset control circuit 3. In response thereto, the control program or the boot program 8 is executed from the execution address reset by the reset signal R.

When the command signal group C is output from the memory rewrite unit 15 in rewriting the control program, the CPU 6 in the control apparatus 1 activates the boot program 8 to start the processing routine shown in the flowchart of FIG. 3.

That is, the CPU 6 permits the SCI processing via the serial communication line L, and clears a writing flag FW provided in an arbitrary register (not shown) inside the CPU 6 to perform various initializations (Step S21), thereby establishing a state of waiting for an interrupt of the SCI processing routine.

Then, in response to the command signal group C, the CPU 6 activates the serial interrupt (SCI) processing routine to start the processing routine shown in the flowchart of FIG. 4.

First, the CPU 6 determines whether or not the writing flag FW has been set (Step S31).

When it is determined in Step S31 that the writing flag FW has been set (i.e., Yes), the CPU 6 performs a write processing of the control program (Step S32) and returns to the SCI processing routine.

In an initial state, the writing flag FW is already cleared through Step S21 in FIG. 3, so it is determined in Step S31 that the writing flag FW has not been set (i.e., No).

Subsequently, the CPU 6 determines whether or not the command signal group C includes an initialization command (Step S33).

When it is determined in Step S33 that the command signal group C includes the initialization command (i.e., Yes), the CPU 6 erases and initializes the control program in the non-volatile ROM 7 (Step S34), and returns to the SCI processing routine.

On the other hand, when it is determined in Step S33 that the command signal group C does not include the initialization command (i.e., No), the CPU 6 determines whether or not the command signal group C includes a checksum command (Step S35).

When it is determined in Step S35 that the command signal group C includes the checksum command (i.e., Yes), the CPU 6 summates values of all the regions of the non-volatile ROM 7 to calculate a sum, transmits the sum to the memory rewrite unit 15 (Step S36), and returns to the SCI processing routine.

If the sum of the non-volatile ROM 7 is abnormal at this time, the memory rewrite unit 15 appropriately performs the rewrite processing again based on the data signals, on the ground that the control program has not been rewritten accurately.

On the other hand, when it is determined in Step S35 that the command signal group C does not include the checksum command (i.e., No), the CPU 6 determines whether or not the command signal group C includes a write command (Step S37).

When it is determined in Step S37 that the command signal group C includes the write command (i.e., Yes), the CPU 6 sets the writing flag FW, clears a counter CNT1 for counting the number of data in the non-volatile ROM 7 (Step S38), and returns to the SCI processing routine.

On the other hand, when it is determined in Step S37 that the command signal group C does not include the write command (i.e., No), the command signal group C is in an indeterminable state. Therefore, the CPU 6 transmits a signal indicating an error state to the memory rewrite unit 15 (Step S39), and returns to the SCI processing routine.

At this time, the memory rewrite unit 15 outputs, for example, the command signal group C to the control apparatus 1 again, in response to the signal indicating the error state.

In the write processing Step S32 in FIG. 4, the processing routine shown in the flowchart of FIG. 5 is executed.

First, the CPU 6 adds an address of the counter CNT1 to a leading address of the non-volatile ROM 7, writes a value of received data (the data signals) into a resultant address (Step S41), and increments the value of the counter CNT1 by "1" (CNT1=CNT1+1) (Step S42).

In the initial state, the counter CNT1 is already cleared through Step S38 in FIG. 4, so the CPU 6 repeatedly increments the counter CNT1 as shown in Step S42 until the counter CNT1 reaches a predetermined data number N.

Then, the CPU 6 determines whether or not the counter CNT1 has reached a value equal to or larger than the predetermined data number N, thereby determining whether or not the received data have been written into all the regions of the non-volatile ROM 7 (Step S43).

When it is determined in Step S43 that the counter CNT1 has not reached the value equal to or larger than the predetermined data number N (CNT1<N) (i.e., No), the CPU 6 immediately terminates the write processing routine of FIG. 5.

On the other hand, when it is determined in Step S43 that the counter CNT1 has reached the value equal to or lager than the predetermined data number N (CNT1≧N) (i.e., Yes), the CPU 6 adds values of all the regions of the non-volatile ROM 7 to calculate a summated value for checksum, transmits the summated value to the memory rewrite unit 15 (Step S44), clears the writing flag FW (Step S45), and terminates the write processing routine of FIG. 5.

By executing the boot program 8 as described above, the control program in the non-volatile ROM 7 is updated according to the new specification.

Subsequently, in response to a change in the rewrite signal A output from the memory rewrite unit 15 from the on state to the off state, the CPU 6 in the control apparatus 1 activates the updated control program to start the processing routine shown in the flowchart of FIG. 6.

At this time, the erasure command signal E for erasing the diagnostic code is output from the memory rewrite unit 15 to the control apparatus 1.

First, with reference to a determination state in the backup power supply off-state determining circuit 11, the CPU 6 determines whether or not the backup power supply circuit 4 has been turned off (Step S51).

When it is determined in Step S51 that the backup power supply has not been turned off (a backup state) (i.e., No), the CPU 6 compares the criterial value in the non-volatile ROM 7 with the predetermined value in the backup RAM 9, and determines whether or not the data stored (control variables) in the backup RAM 9 are abnormal, depending on whether or not the criterial value and the predetermined value fail to coincide with each other (Step S52).

When it is determined in Step S52 that the criterial value in the non-volatile ROM 7 and the predetermined value in the backup RAM 9 coincide with each other and that the data stored in the backup RAM 9 are therefore normal (i.e., No), the CPU 6 performs initialization processings of a RAM other than the backup RAM 9 and the like (Step S53), and performs a normal processing of controlling an on-vehicle device such as an engine, a power train, or the like (Step S54).

On the other hand, when it is determined in Step S51 that the backup power supply has been turned off (i.e., Yes) and it is determined in Step S52 that the criterial value in the non-volatile ROM 7 and the predetermined value in the backup RAM 9 do not coincide with each other and that the data stored in the backup RAM 9 are therefore abnormal (i.e., Yes), the control variables in the backup RAM 9 are initialized to predetermined values corresponding to a new control program (Step S55).

At the same time, the predetermined value in the backup RAM 9 is so changed as to coincide with the criterial value in the non-volatile ROM 7 through initialization in Step S55.

Then, the CPU 6 sets (initializes) the backup power supply off-state determining circuit 11 to the backup state (Step S56), and makes a transition to Step S53.

By manually disconnecting the control apparatus 1 from the battery 13 after the control program has been rewritten, the control variables in the backup RAM 9 can be initialized.

The control variables in the backup RAM 9 can also be initialized in the same manner when it is determined that the data stored in the backup RAM 9 are abnormal.

Subsequently, the CPU 6 determines whether or not a command has been received from the memory rewrite unit 15 (Step S57).

When it is determined in Step S57 that the command has been received from the memory rewrite unit 15 (i.e., Yes), the CPU 6 determines whether or not the command is the erasure command signal E for erasing the diagnostic code (Step S58).

When it is determined in Step S58 that the command is the erasure command signal E (i.e., Yes), the CPU 6 erases the diagnostic code (Step S59), and makes a transition to Step S54 to perform the normal processing again.

On the other hand, when it is determined in Step S57 that the command has not been received from the memory rewrite unit 15 (i.e., No) and it is determined in Step S58 that the command is not the erasure command signal E (i.e., No), the procedure immediately advances to Step S54 to perform the normal processing again.

Thus, in an inter-ECU communication system, in a case where a message from an ECU cannot be responded because a control program in the ECU is being rewritten, a recorded diagnostic code determined to have a communication abnormality can be erased.

The erasure command signal E is incorporated in each of the memory rewrite unit 15, which is used to rewrite the control program in the market, a diagnostic tester distributed to the market, and the like as a rewrite procedure. However, the erasure command signal E is not incorporated in a dedicated rewrite tool used to rewrite a control program in a development stage or the like.

The erasure command signal E is the command signal for erasing the diagnostic code in the inter-ECU communication system. However, the erasure command signal E is output to all the ECUs mounted in the vehicle including the ECU that has rewritten the control program, regardless of whether or not there is any communication among the ECUs.

Next, a characteristic part of the on-vehicle control apparatus according to the first embodiment of the present invention will be described.

A block diagram showing the configuration of the on-vehicle control apparatus according to the first embodiment of the present invention is identical to the aforementioned block diagram of the generally employed on-vehicle control apparatus shown in FIG. 1 and therefore will not be described below.

The on-vehicle control apparatus according to the first embodiment of the present invention is different from the above-mentioned generally employed on-vehicle control apparatus in the processing routine of the control program in the non-volatile ROM 7.

The operation of the on-vehicle control apparatus according to the first embodiment of the present invention will be described hereinafter with reference to a flowchart of FIG. 7.

Figure 7:
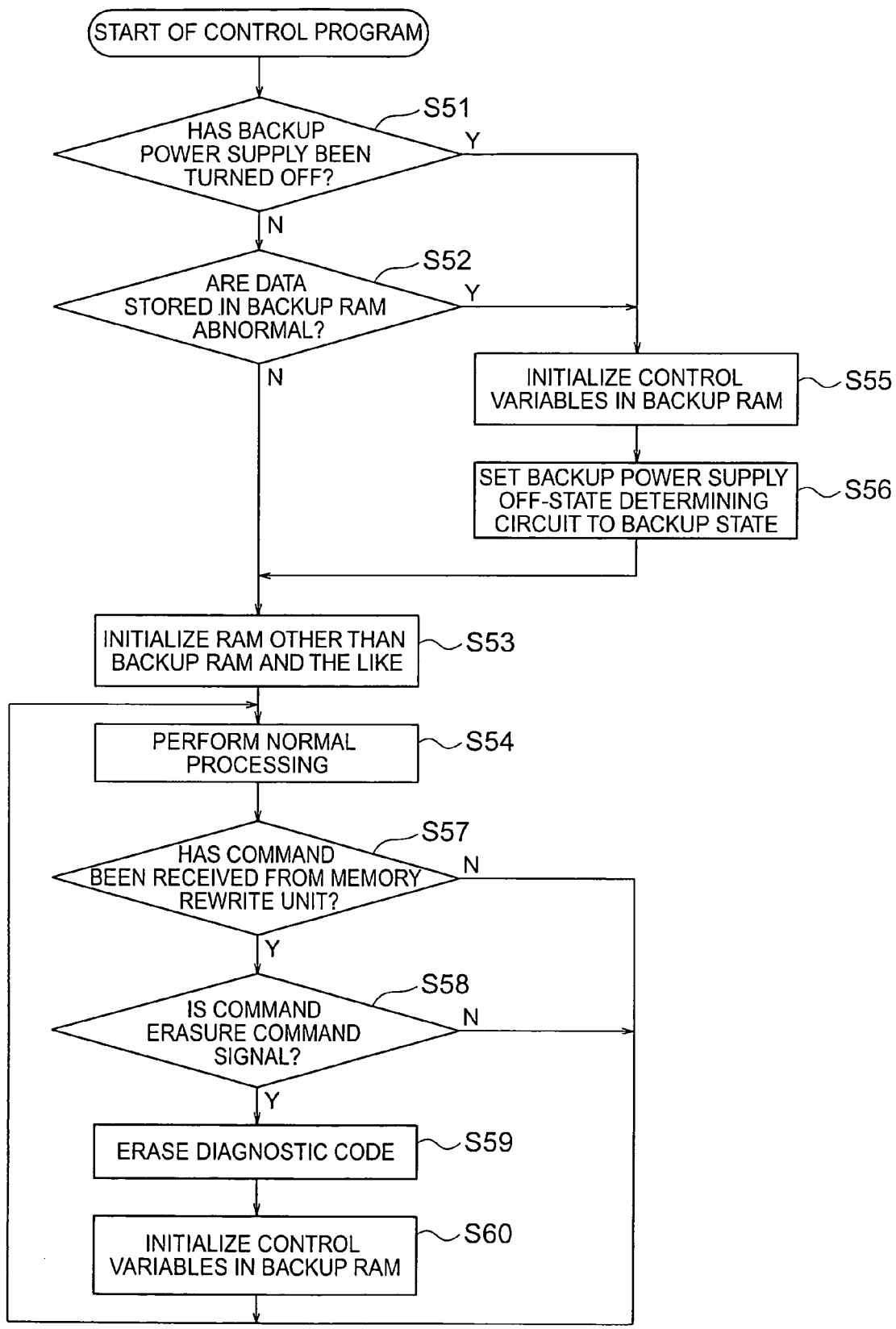
FIG. 7 is a flowchart showing an operation of an on-vehicle control apparatus according to a first embodiment of the present invention.

FIG. 7 corresponds to the processing routine (FIG. 6) of the aforementioned control program. FIG. 7 is different from FIG. 6 in that Step S60 has been added, and is identical thereto in the other Steps S51 to S59.

The not shown configuration, other processing routines, and other operations are the same as those shown in FIGS. 2 to 5. The same operations as described above will not be described in detail.

First, as described above, when the rewrite signal A is changed over from the off state to the on state, the execution address in the memory map for determining the operation of the CPU 6 is changed over to a state in rewriting the control program as shown in FIG. 2B. The CPU 6 then activates the boot program 8 to execute the processing routines shown in the flowcharts of FIGS. 3 to 5, so the control program in the non-volatile ROM 7 is updated according to a new specification.

Then, when the rewrite signal A output from the memory rewrite unit 15 is changed from the on state to the off state after the control program has been updated, the execution address in the memory map of the CPU 6 is changed over to the state during normal operation as shown in FIG. 2A. The CPU 6 activates the updated control program to start the processing routine shown in the flowchart of FIG. 7.

That is, as described above, when it is determined in Step S51 that the backup power supply has not been turned off and it is determined in Step S52 that the data stored in the backup RAM 9 are not abnormal, the CPU 6 performs the initialization processing of the RAM and the like other than the backup RAM 9 (Step S53), and performs the normal processing (Step S54).

When it is determined in Step S51 that the backup power supply has been turned off and it is determined in Step S52 that the data stored in the backup RAM 9 are abnormal, the CPU 6 initializes the control variables in the backup RAM 9 to predetermined values corresponding to a new control program (Step S55), initializes the backup power supply off-state determining circuit 11 (Step S56), and makes a transition to Step S53.

Subsequently, the CPU 6 determines whether or not a command has been received from the memory rewrite unit 15 (Step S57). When it is determined that the command has been received from the memory rewrite unit 15 (i.e., Yes), the CPU 6 determines whether or not the command is the erasure command signal E (Step S58).

When it is determined in Step S58 that the command is the erasure command signal E (i.e., Yes), the CPU 6 erases the diagnostic code (Step S59). The CPU 6 initializes the control variables in the backup RAM 9 to predetermined values corresponding to a new control program (Step S60), and makes a transition to Step S54 to perform the normal processing again.

On the other hand, when it is determined in Step S57 that the command has not been received from the memory rewrite unit 15 (i.e., No) and it is determined in Step S58 that the command is not the erasure command signal E (i.e., No), the procedure immediately advances to Step S54 to perform the normal processing again.

Thus, even when the resolution and the like of the control variables in the backup RAM 9 are changed depending on whether or not the control program has been rewritten, the CPU 6 executes the control program using the control variables initialized to the predetermined values corresponding to the new control program, without using last values of the control variables.

Therefore, an inconvenience resulting from the inappropriateness of the control variables in the backup RAM 9 can be avoided reliably.

Also, a failure to initialize the backup RAM 9 resulting from a forgotten attempt to shut off the backup power supply circuit 4, or an increase in cost resulting from an increase in the number of man-hours for disconnection and connection can be avoided.

In the on-vehicle control apparatus according to the first embodiment of the present invention, the memory rewrite unit 15 outputs the erasure command signal E for erasing the diagnostic code, and the control program initializes the control variables in the backup RAM 9 to the predetermined values corresponding to the new control program in response to the erasure command signal E when being activated after having been rewritten.

As described above, the erasure command signal E is incorporated in each of the memory rewrite unit 15, which is used to rewrite the control program in the market, the diagnostic tester distributed in the market, and the like as a rewrite procedure. However, the erasure command signal E is not incorporated in the dedicated rewrite tool used to rewrite a control program in the development stage and the like.

Therefore, while the control variables in the backup RAM 9 are not initialized in rewriting the control program in the development stage, the control variables in the backup RAM 9 can be automatically initialized in rewriting the control program in the market. As a result, the efficiency of development can be enhanced.

Second Embodiment

Although the control program initializes the control variables in the backup RAM 9 in response to the erasure command signal E in the foregoing first embodiment of the present invention, the present invention should not be limited thereto. In response to the erasure command signal E, the control program may set the predetermined value stored in the backup RAM 9 to an abnormal value different from the criterial value stored in the non-volatile ROM 7, so that a determination on an abnormality is made in Step S52 for making a determination on an abnormality of the data stored in the backup RAM 9.

Hereinafter, a processing of setting the predetermined value stored in the backup RAM 9 to the abnormal value different from the criterial value stored in the non-volatile ROM 7 will be described.

The configuration of the on-vehicle control apparatus according to the second embodiment of the present invention is identical to that of the first embodiment of the present invention and thus will not be described below.

Hereinafter, the operation of the on-vehicle control apparatus according to the second embodiment of the present invention will be described with reference to a flowchart of FIG. 8.

Figure 8:
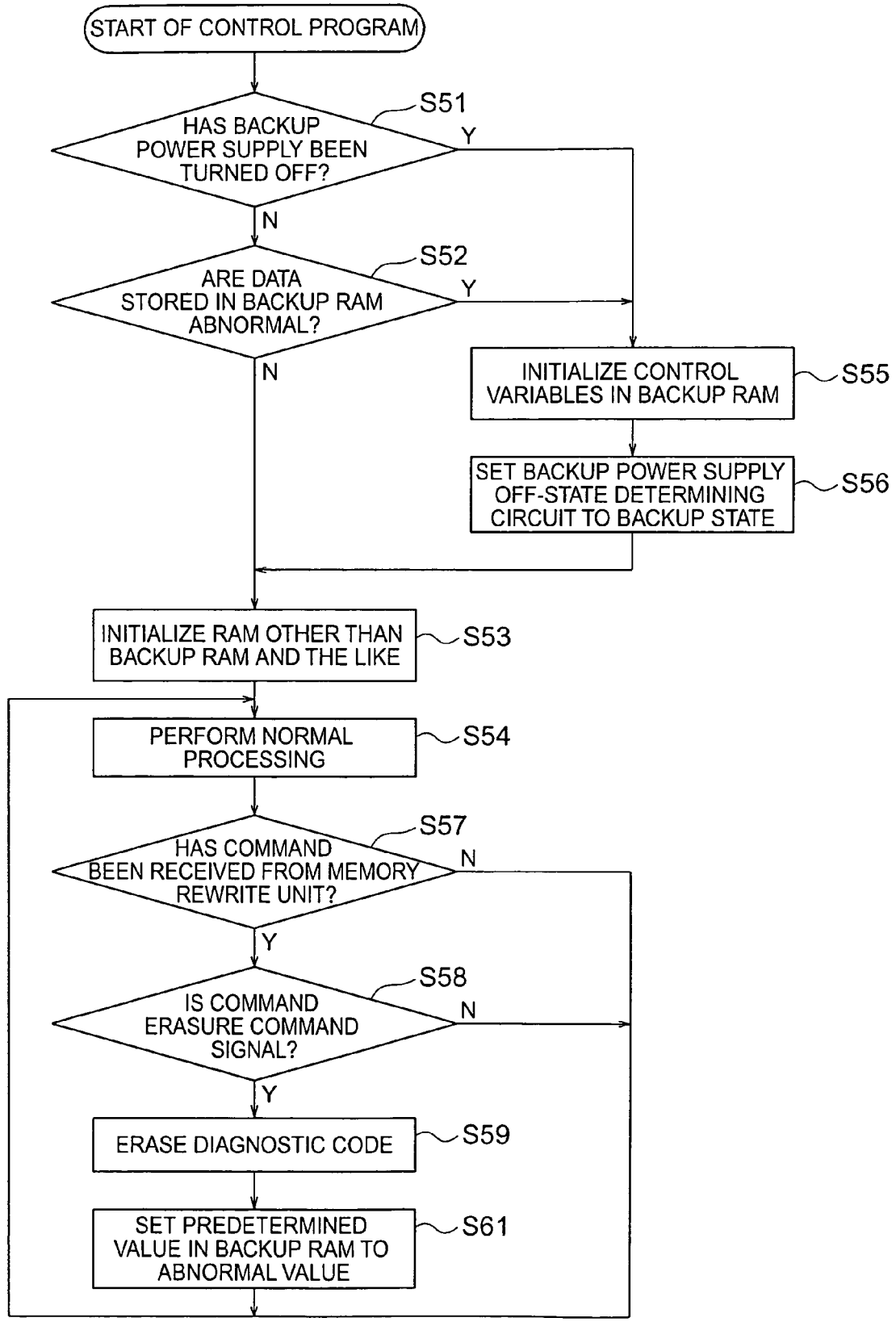
FIG. 8 is a flowchart showing an operation of an on-vehicle control apparatus according to a second embodiment of the present invention.

FIG. 8 corresponds to the processing routine (FIG. 7) of the aforementioned control program. FIG. 8 is different from FIG. 7 in that Step S60 has been changed to Step S61, and is identical thereto in the other Steps S51 to S59.

The not shown configuration, other processing routines, and other operations are the same as those shown in FIGS. 2 to 6. The same operations as described above will not be described in detail.

Then, when the rewrite signal A output from the memory rewrite unit 15 is changed from the on state to the off state after the control program has been updated, the execution address in the memory map of the CPU 6 is changed over to the state during normal operation as shown in FIG. 2A. The CPU 6 activates the updated control program to start the processing routine shown in the flowchart of FIG. 8.

That is, as described above, when it is determined in Step S51 that the backup power supply has not been turned off and it is determined in Step S52 that the data stored in the backup RAM 9 are not abnormal, the CPU 6 performs the initialization processing of the RAM and the like other than the backup RAM 9 (Step S53), and performs the normal processing (Step S54).

When it is determined in Step S51 that the backup power supply has been turned off and it is determined in Step S52 that the data stored in the backup RAM 9 are abnormal, the CPU 6 initializes the control variables in the backup RAM 9 to predetermined values corresponding to a new control program (Step S55), initializes the backup power supply off-state determining circuit 11 (Step S56), and makes a transition to Step S53.

Subsequently, the CPU 6 determines whether or not a command has been received from the memory rewrite unit 15 (Step S57). When it is determined that the command has been received from the memory rewrite unit 15 (i.e., Yes), the CPU 6 determines whether or not the command is the erasure command signal E (Step S58).

When it is determined in Step S58 that the command is the erasure command signal E (i.e., Yes), the CPU 6 erases the diagnostic code (Step S59). The CPU 6 sets the predetermined value stored in the backup RAM 9, which is used in Step S52 for making a determination on an abnormality of the data stored in the backup RAM 9, to an abnormal value different from the criterial value stored in the non-volatile ROM 7 (Step S61).

However, after the predetermined value in the backup RAM 9 has been set to the abnormal value in Step S61, the CPU 6 only repeats the processings in Steps S54 to S61 periodically. The CPU 6 neither makes a determination on an abnormality of the data stored in the backup RAM 9 in Step S52 nor initializes the control variables in the backup RAM 9 in Step S55.

On the other hand, when the erasure command signal E is output to all the ECUs mounted in the vehicle, the memory rewrite unit 15, which is used to rewrite the control program in the market, completes the entire rewrite procedure and then is disconnected from the on-vehicle control apparatus.

Subsequently, when the on-vehicle control apparatus is activated after the memory rewrite unit 15 has been disconnected therefrom, the CPU 6 activates the control program to start the processing routine shown in the flowchart of FIG. 8 again.

At this time, it is determined in Step S52 that the criterial value in the non-volatile ROM 7 and the predetermined value in the backup RAM 9 do not coincide with each other and that the data stored in the backup RAM 9 are abnormal (i.e., Yes). Then in Step S55, the control variables in the backup RAM 9 are initialized to the predetermined values corresponding to the new control program.

Thus, an inconvenience resulting from the inappropriateness of the control variables in the backup RAM 9 can be avoided reliably with a simple configuration and a simple operational procedure.

In the on-vehicle control apparatus according to the second embodiment of the present invention, the memory rewrite unit 15 outputs the erasure command signal E to erase the diagnostic code, and the control program sets the predetermined value stored in the backup RAM 9 to the abnormal value in response to the erasure command signal E when being activated after having been rewritten. When being activated next time, the control program initializes the control variables in the backup RAM 9 to the predetermined values corresponding to the new control program in response to a failure in coincidence between the abnormal value and the criterial value.

Therefore, an effect similar to that of the foregoing first embodiment of the present invention can be achieved.

Although the control program sets the predetermined value stored in the backup RAM 9 to the abnormal value in response to the erasure command signal E in the foregoing second embodiment of the present invention, the present invention should not be limited thereto. The control program may set therein a criterial value that is different from the predetermined value stored in the backup RAM 9 in response to the erasure command signal E.

In this case as well, an effect similar to that of the foregoing second embodiment of the present invention can be achieved.

Third Embodiment

Figure 9:
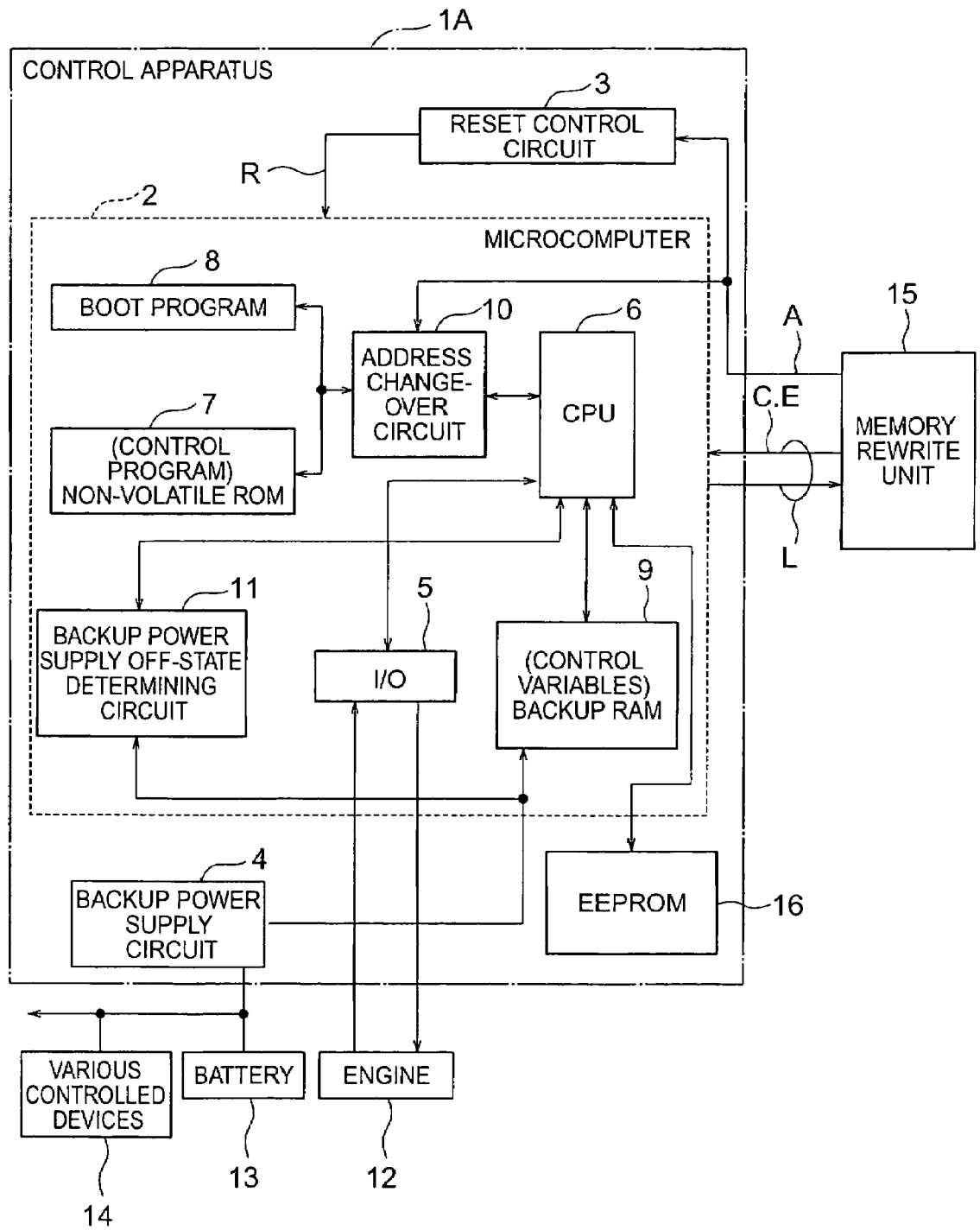
FIG. 9 is a block diagram showing an on-vehicle control apparatus according to a third embodiment of the present invention.

FIG. 9 is a block diagram showing an on-vehicle control apparatus according to a third embodiment of the present invention.

In FIG. 9, a control apparatus 1A is connected to the CPU 6 and further equipped with an electrically erasable and rewritable EEPROM 16.

Other configurational details of the third embodiment of the present invention are identical to those of the first embodiment of the present invention and thus will not be described below.

The EEPROM 16 is provided to protect data when the supply of power to the backup RAM 9 is shut off. The same data as the control variables stored in the backup RAM 9 are stored in the EEPROM 16.

The control variables stored in the EEPROM 16 are stored into the backup RAM 9 as predetermined control variables when the supply of power to the backup RAM 9 is shut off.

Hereinafter, the operation of the on-vehicle control apparatus according to the third embodiment of the present invention will be described with reference to a flowchart of FIG. 10.

Figure 10:
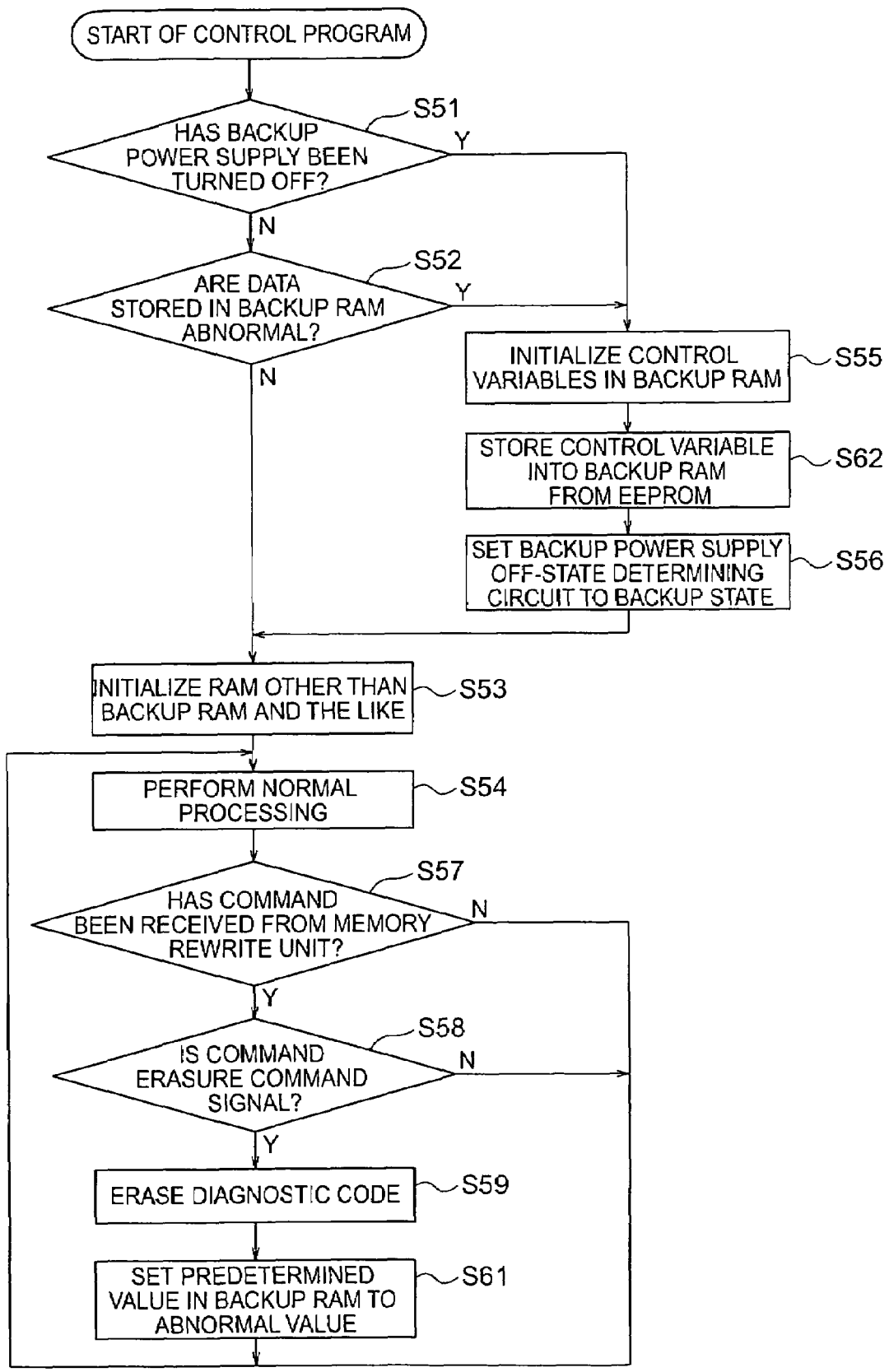
FIG. 10 is a flowchart showing an operation of the on-vehicle control apparatus according to the third embodiment of the present invention.

FIG. 10 corresponds to the processing routine (FIG. 8) of the aforementioned control program. FIG. 10 is different from FIG. 8 in that Step S62 has been added, and is identical thereto in the other Steps S51 to S61.

The not shown configuration, other processing routines, and other operations are the same as those shown in FIGS. 2 to 6. The same operations as described above will not be described in detail.

When the rewrite signal A output from the memory rewrite unit 15 is changed from the on state to the off state after the control program has been updated, the execution address in the memory map of the CPU 6 is changed over to the state during normal operation as shown in FIG. 2A. The CPU 6 activates the updated control program to start the processing routine shown in the flowchart of FIG. 10.

That is, as stated above, when it is determined in Step S58 that the command is the erasure command signal E (i.e., Yes), the CPU 6 erases the diagnostic code (Step S59). The CPU 6 sets the predetermined value stored in the backup RAM 9, which is used in Step S52 for making a determination on an abnormality of the data stored in the backup RAM 9, to an abnormal value different from the criterial value stored in the non-volatile ROM 7 (Step S61).

On the other hand, when the memory rewrite unit 15, which is used to rewrite the control program in the market, outputs the erasure command signal E to all the ECUs mounted in the vehicle, it completes the entire rewrite procedure and then is disconnected from the on-vehicle control apparatus.

Subsequently, when the on-vehicle control apparatus is activated after the memory rewrite unit 15 has been disconnected therefrom, the CPU 6 activates the control program to start the processing routine shown in the flowchart of FIG. 10 again.

At this time, it is determined in Step S52 that the criterial value in the non-volatile ROM 7 and the predetermined value in the backup RAM 9 do not coincide with each other and that the data stored in the backup RAM 9 are abnormal (i.e., Yes). Then in Step S55, the control variables in the backup RAM 9 are initialized to the predetermined values corresponding to the new control program.

Subsequently, the CPU 6 stores a predetermined one of the control variables stored in the EEPROM 16 into the backup RAM 9 as a predetermined control variable (Step S62).

The predetermined control variable represents a control variable that needs to be retained and reutilized without being initialized.

In the on-vehicle control apparatus according to the third embodiment of the present invention, the control program initializes the control variables in the backup RAM 9 and then stores a predetermined one of the control variables in the EEPROM 16 into the backup RAM 9.

Therefore, only a minimum required one of the control variables can be initialized as the control program is rewritten. That one of the control variables which is desired to be retained and reutilized without being initialized can be stored into the backup RAM 9 from the EEPROM 16 even when the control program has been rewritten in the market. Thus, the controllability of the rewritten control program can be enhanced.

Fourth Embodiment

The control program initializes the control variables in the backup RAM 9 in response to the erasure command signal E in the foregoing first embodiment of the present invention. In response to the erasure command signal E, the control program may set the predetermined value stored in the backup RAM 9 to an abnormal value different from the criterial value stored in the non-volatile ROM 7 so that a determination on an abnormality is made in Step S52 for making a determination on an abnormality on the data stored in the backup RAM 9 in the foregoing second and third embodiments of the present invention.

However, the present invention should not be limited thereto. The control program may initialize the control variables in the backup RAM 9 in response to an initialization command signal that is output from the memory rewrite unit 15 to initialize the control variables in the backup RAM 9.

A processing of initializing the control variables in the backup RAM 9 in response to the initialization command signal will be described hereinafter.

The configuration of the on-vehicle control apparatus according to the fourth embodiment of the present invention is identical to that of the foregoing third embodiment of the present invention and thus will not be described below.

The initialization command signal (not shown) is incorporated in each of the memory rewrite unit 15, which is used to rewrite the control program in the market, the diagnostic tester distributed to the market, and the like as a rewrite procedure.

The operation of the on-vehicle control apparatus according to the fourth embodiment of the present invention will be described hereinafter with reference to a flowchart of FIG. 11.

FIG. 11 corresponds to the processing routine (FIG. 10) of the aforementioned control program. FIG. 11 is different from FIG. 10 in that Step S63 has been added, and is identical thereto in the other Steps S51 to S62.

The not shown configuration, other processing routines, and other operations are the same as those shown in FIGS. 2 to 6. The same operations as described above will not be described in detail.

When the rewrite signal A output from the memory rewrite unit 15 is changed from the on state to the off state after the control program has been updated, the execution address in the memory map of the CPU 6 is changed over to the state during normal operation as shown in FIG. 2A. The CPU 6 activates the updated control program to start the processing routine shown in the flowchart of FIG. 11.

That is, the CPU 6 determines whether or not a command has been received from the memory rewrite unit 15 (Step S57). When it is determined that the command has been received from the memory rewrite unit 15 (i.e., Yes), the CPU 6 determines whether or not the command is the erasure command signal E (Step S58).

When it is determined in Step S58 that the command is the erasure command signal E (i.e., Yes), the CPU 6 erases the diagnostic code (Step S59), and determines whether or not the command received from the memory rewrite unit 15 is an initialization command signal (Step S63).

On the other hand, when it is determined in Step S58 that the command is not the erasure command signal E (i.e., No), the procedure immediately advances to Step S63.

When it is determined in Step S63 that the command is the initialization command signal (i.e., Yes), the CPU 6 sets the predetermined value stored in the backup RAM 9, which is used in Step S52 for making a determination on an abnormality of the data stored in the backup RAM 9, to an abnormal value different from the criterial value stored in the non-volatile ROM 7 (Step S61), and makes a transition to Step S54 to perform the normal processing again.

On the other hand, when it is determined in Step S57 that the command has not been received from the memory rewrite unit 15 (i.e., No) and it is determined in Step S63 that the command is not the initialization command signal (i.e., No), the procedure immediately advances to Step S54 to perform the normal processing again.

In the on-vehicle control apparatus according to the fourth embodiment of the present invention, instead of initializing the control variables in the backup RAM 9 in response to the erasure command signal E, the initialization command signal for initializing the control variables in the backup RAM 9 is incorporated in each of the memory rewrite unit 15, which is used to rewrite the control program in the market, the diagnostic tester distributed to the market, and the like as a rewrite procedure. Thus, an effect similar to those of the first to third embodiments of the present invention can be achieved.

What is claimed is:

1. An on-vehicle control apparatus, comprising:
a CPU for controlling an on-vehicle device based on a control program using various control variables;
a rewritable non-volatile memory for storing the control program;
a backup RAM for storing the control variables therein;
a backup power supply circuit for supplying power to the backup RAM;
a boot program for causing the CPU to rewrite the control program;
an address changeover circuit for making a changeover in an execution address of the CPU to the boot program in rewriting the control program; and
a memory rewrite unit, wherein:
the memory rewrite unit outputs a rewrite signal for causing the address changeover circuit to operate, a command signal group including a command for activating the boot program, and an erasure command signal for erasing a diagnostic code after the control program has been rewritten; and
the control program initializes the control variables in the backup RAM in response to the erasure command signal when being activated after having been rewritten.

2. An on-vehicle control apparatus according to claim 1, further comprising an electrically erasable and rewritable EEPROM for storing therein the control variables stored in the backup RAM,
wherein the control program initializes the control variables in the backup RAM and then stores a predetermined one of the control variables in the EEPROM into the backup RAM.

3. An on-vehicle control apparatus according to claim 1, wherein the memory rewrite unit outputs an initialization command signal for initializing the control variables in the backup RAM as the erasure command signal.

4. An on-vehicle control apparatus according to claim 2, wherein the memory rewrite unit outputs an initialization command signal for initializing the control variables in the backup RAM as the erasure command signal.

5. An on-vehicle control apparatus, comprising:
a CPU for controlling an on-vehicle device based on a control program using various control variables;
a rewritable non-volatile memory for storing the control program therein;
a backup RAM for storing the control variables therein;
a backup power supply circuit for supplying power to the backup RAM;
a boot program for causing the CPU to rewrite the control program;
an address changeover circuit for making a changeover in an execution address of the CPU to the boot program in rewriting the control program; and
a memory rewrite unit, wherein:
the memory rewrite unit outputs a rewrite signal for causing the address changeover circuit to operate, a command signal group including a command for activating the boot program, and an erasure command signal for erasing a diagnostic code after the control program has been rewritten; and
the control program compares a criterial value in the non-volatile memory with a predetermined value in the backup RAM, initializes the control variables in the backup RAM when the control program determines that the criterial value does not coincide with the predetermined value, sets the predetermined value to an abnormal value in response to the erasure command signal when being activated after having been rewritten, and initializes the control variables in the backup RAM in response to a failure in coincidence between the abnormal value and the criterial value when being activated next time.

6. An on-vehicle control apparatus according to claim 5 further comprising an electrically erasable and rewritable EEPROM for storing therein the control variables stored in the backup RAM,
wherein the control program initializes the control variables in the backup RAM and then stores a predetermined one of the control variables in the EEPROM into the backup RAM.

7. An on-vehicle control apparatus according to claim 5, wherein the memory rewrite unit outputs an initialization command signal for initializing the control variables in the backup RAM as the erasure command signal.

* * * * *